United States Patent
Jennery et al.

(10) Patent No.: US 6,742,025 B2
(45) Date of Patent: *May 25, 2004

(54) SYSTEM AND METHOD FOR SERVER MANAGED MODIFICATION OF OPERATING SYSTEM DATA STORED WITHIN A NETWORK DEVICE

(75) Inventors: Aidon P. Jennery, Round Rock, TX (US); Charles A. Gotwald, Round Rock, TX (US)

(73) Assignee: International Business Machines Corp., Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/409,472

(22) Filed: Sep. 30, 1999

(65) Prior Publication Data

US 2003/0105847 A1 Jun. 5, 2003

(51) Int. Cl.[7] ............................................. G06F 15/177
(52) U.S. Cl. ......................... 709/220; 709/221; 717/168
(58) Field of Search ................................ 709/220, 221; 717/11, 168, 169

(56) References Cited

U.S. PATENT DOCUMENTS

| | | | | |
|---|---|---|---|---|
| 5,155,847 A | * | 10/1992 | Kirouac et al. | 709/221 |
| 5,790,664 A | * | 8/1998 | Coley et al. | 709/203 |
| 6,052,720 A | * | 4/2000 | Traversat et al. | 709/220 |
| 6,266,809 B1 | * | 7/2001 | Craig et al. | 717/11 |
| 6,381,741 B1 | * | 4/2002 | Shaw | 717/168 |
| 6,418,555 B2 | * | 7/2002 | Mohammed | 717/169 |

OTHER PUBLICATIONS

Talcott, Dale. "RevRdist Administrator's Guide" Purdue University Computing Center, 1996.*

* cited by examiner

*Primary Examiner*—Zarni Maung
(74) *Attorney, Agent, or Firm*—Kevin L. Daffer; Conley Rose P.C.; Marilyn S. Dawkins, IBM (57) ABSTRACT

A network is described including a server and a network device remotely coupled to the server. The network device includes a non-volatile storage device having data stored therein, which is preferably modified solely in response to instructions generated by the server. During initialization, the network device performs a first portion of an operating system boot sequence then generates and forwards trigger data, which includes identification information for identifying the network device, to the server. In response, the server generates action data, which includes one or more data update instructions for modifying the data stored within the non-volatile storage device. Following a second portion of the operating system boot sequence, the action data is forwarded from the server to the network device. If the action data includes one or more data update instructions, the network device performs the one or more data update instructions and repeats the operating system boot sequence.

26 Claims, 8 Drawing Sheets

FIG. 4 (60)
- SIGNATURE
- VERSION
- ID
- ⋮

FIG. 5 (62)
- SIGNATURE
- VERSION
- ID
- FILE NAME | C/D
- FILE NAME | C/D
- ⋮
- FILE NAME | C/D
- ⋮

(64 points to the C/D column)

FIG. 6 (66)
- ID
- FILE NAME | VERSION
- FILE NAME | VERSION
- ⋮
- FILE NAME | VERSION
- ⋮

FIG. 7 (68)
- SIGNATURE
- VERSION
- ID
- FILE NAME | VERSION
- FILE NAME | VERSION
- ⋮
- FILE NAME | VERSION
- ⋮

SYSTEM AND METHOD FOR SERVER MANAGED MODIFICATION OF OPERATING SYSTEM DATA STORED WITHIN A NETWORK DEVICE

BACKGROUND OF THE INVENTION

1. Field of the Invention

This invention relates to networks, and more particularly to networks including one or more network devices remotely coupled to a server.

2. Description of Related Art

A typical personal computer includes a central processing unit (CPU), volatile memory, non-volatile memory (e.g., read only memory or ROM), and a non-volatile storage device (e.g., a hard drive). Operating system data (including instructions) is stored in the non-volatile memory and/or the non-volatile storage device, and accessed by the CPU during startup initialization (i.e., during a boot sequence). Application programs are typically stored in the non-volatile storage device. When a given application program is initiated, at least a portion of the application program is copied into the volatile memory and accessed by the CPU.

A network is formed by linking multiple computing devices together. In a local area network or LAN, the computing devices are geographically close together (e.g., within the same building), and may be coupled to a common transmission medium (e.g., copper wires or fiber optic cable). In a wide area network or WAN, the computing devices are further apart and may be connected by telephone lines or radio signals traveling through air.

In the popular client/server network architecture, at least one of the network computing devices is a server. Each server is a relatively powerful computing device dedicated to managing one or more data storage devices (e.g., high capacity disk drives), network communication traffic, and/or network printers. Clients are computing devices (e.g., personal computers or workstations) on which users run application programs. The network clients rely on the server for resources such as centralized database files, access to other network devices (e.g., printers), and/or processing power.

Personal computers are often linked together to form networks in order to share resources (e.g., centralized databases, printers, etc.). Each personal computer is in itself a complex computing device including hardware and software which must be independently set up and maintained. As a result, managing a network of personal computers requires substantial amounts of time and money.

Recognizing that client computing devices in a client/server network may rely on the more capable server for data storage and/or processing power, client computing devices called "network computers" have been developed. In general, network computers have a CPU and memory sufficient to run application programs, connections for input and display devices, and a communication adapter for connecting to a network transmission medium. The non-volatile data storage capacities of network computers are typically minimal, and the server stores some or all of the data (including application programs) required by the network computers. The server provides needed data to the client network computers on demand. As a result, the hardware of a network computer is less complex, less expensive, and easier to maintain than that of a personal computer. In addition, application program upgrades occur on the server and are therefore simpler to accomplish.

Drawbacks to the use of network computers include increased server loading and network communication traffic. Data formerly stored within client personal computers is now stored within the server and provided to client network computers when needed via the network transmission medium. As a result, the amount of network traffic is increased.

As defined herein, a network device is a device adapted for coupling to a computer network (e.g., via a transmission medium) and configured to transmit and/or receive data via the computer network. A representative network device may include, for example, a CPU coupled to a memory. The CPU may execute instructions stored within the memory in order to transmit and/or receive data via the computer network. Examples of network devices include personal computers, network computers, personal digital assistants (PDAs), hand-held computers, palmtop computers, cellular telephones, and input/output devices such as printers and scanners.

When network devices have non-volatile storage devices and store data (e.g., application programs) in the non-volatile storage devices, it is necessary to update the stored data when more current versions of the data exist on the server (i.e., when the stored data is "out of date"). A known data update method involves a network device accessing a server storage device, comparing version information of files stored in the non-volatile storage device to version information of like files stored in the server storage device, and copying files from the server storage device to the non-volatile storage device if the file version information does not match. In addition to contributing substantially to network traffic, the known update method is controlled by the network device and not by the server. The server has no control over what data is stored in the non-volatile storage device of the network device.

It would be desirable to have a system and method for server managed modification of data, including operating system data, stored within a network device. The desired system and method should allow the server to control the data stored in a non-volatile storage device of the network device. The desired system and method should also require a minimum of network communication traffic to accomplish the data modification.

SUMMARY OF THE INVENTION

A network is described including a server and a network device remotely coupled to the server. The network device includes a non-volatile storage device having data stored therein. The data stored within the non-volatile storage device includes operating system data (including instructions) and/or application programs. The computer system includes hardware and software for server managed modification of the data stored within the non-volatile storage device. The data stored within the non-volatile storage device is preferably modified solely in response to instructions generated by the server.

During initialization, the network device performs an operating system boot sequence in order to load an operating system into a memory of the network device. In one embodiment, the network device performs a first portion of the operating system boot sequence, then generates trigger data forwarded to the server. The trigger data includes identification information for identifying the network device. In response to the trigger data, the server generates action data while the network device performs a second portion of the operating system boot sequence. The action data includes one or more data update instructions for modifying (i.e., updating) the data, including operating system data, stored within the non-volatile storage device. Following the second portion of the operating system boot sequence, the action data is forwarded from the server to the network device. If the action data includes one or more update instructions, the network device performs the one or more update instructions and repeats the operating system boot sequence.

The network device includes a central processing unit (CPU) adapted to execute instructions, and the data stored within the non-volatile storage device of the network device may include instructions. The data stored within the non-volatile storage device may be organized, for example, as multiple files each having a different file name. In this case, each data update instruction may include a file name and a corresponding file update instruction. The file update instruction may direct the network device to either: (i) copy a file having the file name from the server to the data stored within the non-volatile storage device of the network device, or (ii) delete a file having the file name from the data stored within the non-volatile storage device of the network device.

For example, the data stored within the non-volatile storage device may include a first file. A second file stored within a storage device of the server may be an updated version of the first file. In this case, the first and second files have the same file name. Action data generated by the server may include a data update instruction having the file name of the first file and a file update instruction which directs the network device to copy the second file from the server to the data stored within the non-volatile storage device of the network device. The network device responds to the file update instruction by copying the second file from the server to the data stored within the non-volatile storage device such that the first file is overwritten by the second file.

A method for updating data within the computer system includes: (i) forwarding trigger data from the network device to the server during the operating system boot sequence, wherein the trigger data identifies the network device, (ii) conveying action data from the server to the network device during the operating system boot sequence, wherein the action data includes one or more data update instructions described above, and (iii) repeating the operating system boot sequence. The data stored within the non-volatile storage device of the network device may be modified by the network device only in response to the action data. The network device performs the one or more data update instructions as described above in order to update the data stored within the non-volatile storage device. Following performance of the data update instructions and prior to the repeating the operating system boot sequence, the network device may forward update data to the server for updating configuration data. The configuration data includes information about the data stored within the non-volatile storage device of the network device (e.g., the current contents of the non-volatile storage device). The configuration data is preferably stored exclusively in the server.

BRIEF DESCRIPTION OF THE DRAWINGS

Other objects and advantages of the invention will become apparent upon reading the following detailed description and upon reference to the accompanying drawings in which.

DETAILED DESCRIPTION OF PREFERRED EMBODIMENTS

Figure 1:
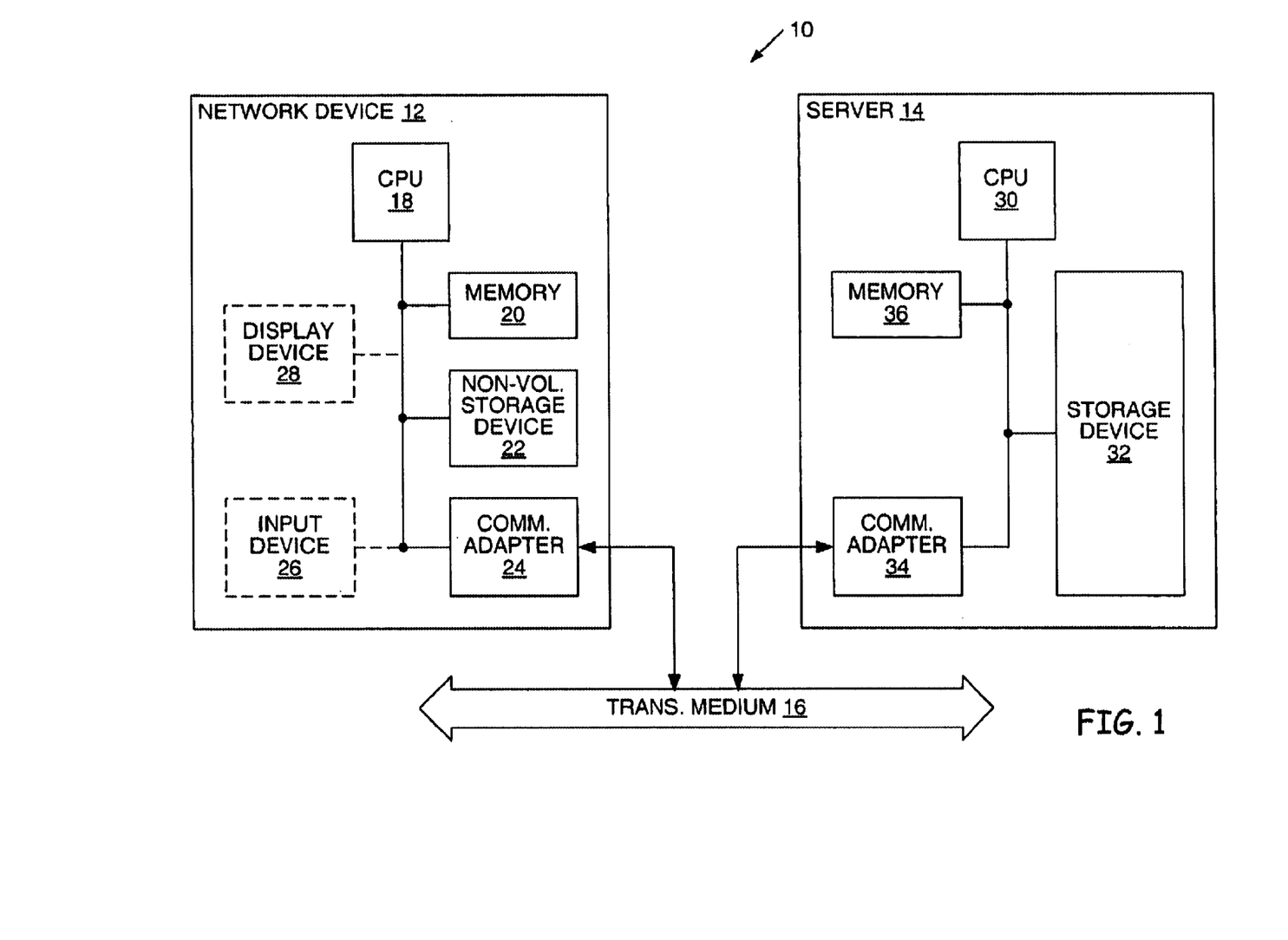
FIG. 1 is a block diagram of one embodiment of a network including a network device coupled to a server via a transmission medium, wherein the network device includes a non-volatile storage device.

FIG. 1 is a block diagram of one embodiment of a network 10. Network 10 includes a network device 12 coupled to a server 14 via a transmission medium 16. Network device 12 and server 14 communicate via transmission medium 16. Network device 12 may be, for example, a network computer or other type of device adapted for coupling to a network. Network device 12 includes a non-volatile storage device 22 for storing data which must be periodically updated. In the embodiment of FIG. 1, network device 12 also includes a central processing unit (CPU) 18 coupled to a memory 20 for storing data and a communication adapter 24 for communicating with server 14 and any other network devices. CPU 18 may also be coupled to an optional input device 26 for inputting data (e.g., a keyboard or a mouse) and an optional display device 28 for displaying data (e.g., a monitor). Alternately, network device 12 may include connectors for coupling CPU 18 to an external input device such as optional input device 26 and an external display device such as optional display device 28. Communication adapter 24 is coupled to transmission medium 16, and transmits and receives data via transmission medium 16. Network 10 may also include other network devices similar to network device 12 and coupled to transmission medium 16.

CPU 18 executes instructions of an instruction set (e.g., the x86 instruction set). Non-volatile storage device 22 stores data including instructions (e.g., application programs, operating system routines, etc.). During operation of network device 12, CPU 18 fetches and executes instructions from non-volatile storage device 22. As will be described in more detail below, the data stored within non-volatile storage device 22 is modified only in response to data update instructions from server 14. Thus when CPU 18 is not performing data update instructions received from server 14, CPU 18 may read data stored within non-volatile storage device 22, but CPU 18 does not write to the data stored within non-volatile storage device 22. Thus the data stored within non-volatile storage device 22 appears as "read only data" to CPU 18 when CPU 18 is not performing data update instructions from server 14.

Data stored within non-volatile storage device 22 is retained even when electrical power is removed from non-volatile storage device 22. Non-volatile storage device 22 may be, for example, a hard disk drive or one of several different types of non-volatile semiconductor memories. Suitable types of non-volatile semiconductor memories include flash memory and electrically erasable programmable random access memory (EEPROM).

Transmission medium 16 carries data between network device 12, server 14, and any other network devices coupled to transmission medium 16. Transmission medium 16 may include metal wires for carrying electrical signals. Alternately, transmission medium 16 may be a fiber-optic cable for conveying light signals. Further, transmission medium 16 may be air through which electromagnetic signals (e.g., light or radio waves) travel.

Server 14 includes a CPU 30 coupled to a storage device 32 for storing data, a communication adapter 34 for communicating with network device 12 and any other network devices, and a memory 36 for storing data. Communication adapter 34 is coupled to transmission medium 16, and transmits and receives data via transmission medium 16.

Figure 2:
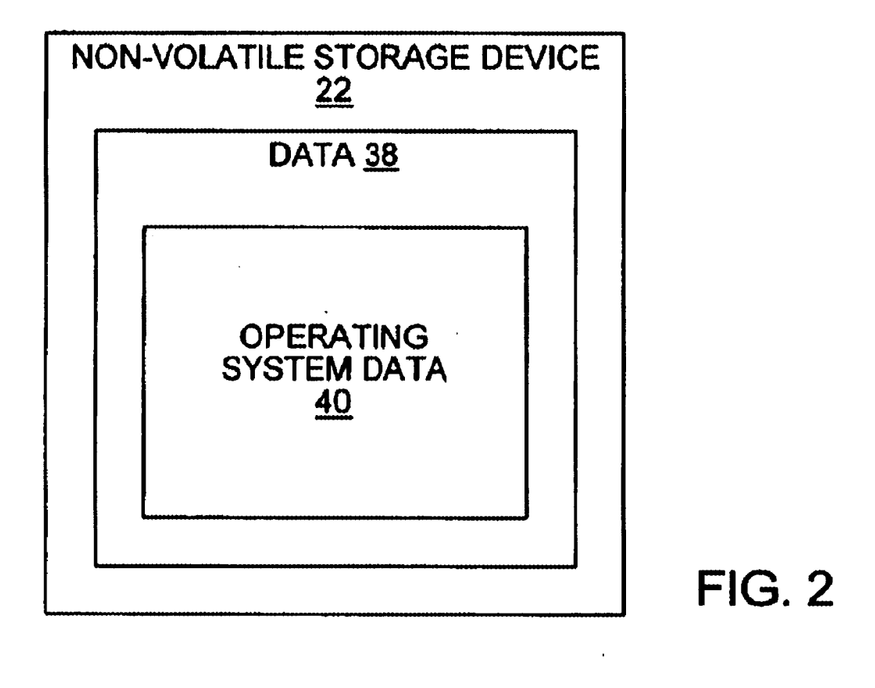
FIG. 2 is a block diagram of one embodiment of the non-volatile storage device of FIG. 1, wherein the non-volatile storage device includes data, and wherein the data includes operating system data.

FIG. 2 is a block diagram of one embodiment of non-volatile storage device 22 of network device 12. In the embodiment of FIG. 2, non-volatile storage device 22 includes data 38. Data 38 includes operating system data 40. Operating system data 40 may include instructions, and comprises at least a portion of an operating system. Data 38 may also include instructions of one or more application programs.

In order to initialize network device 12, CPU 18 performs an operating system boot sequence. CPU 18 may, for example, perform the boot sequence when CPU 18 receives an asserted reset signal. The reset signal may be asserted, for example, when power is initially applied to network device 12, or when a user initiates a re-initialization process (i.e., a reboot) during operation of network device 12. Execution of boot sequence instructions causes CPU 18 to load an operating system, and at least a portion of operating system data 40, into memory 20 of network device 12. CPU 18 then executes operating system instructions located within memory 20. Operating system data 40 may include boot sequence data, or may be a part of the boot sequence data. Alternately, the boot sequence data may reside within a non-volatile memory within network device 12, or may be conveyed to network device 12 (e.g., from server 14).

Figure 3:
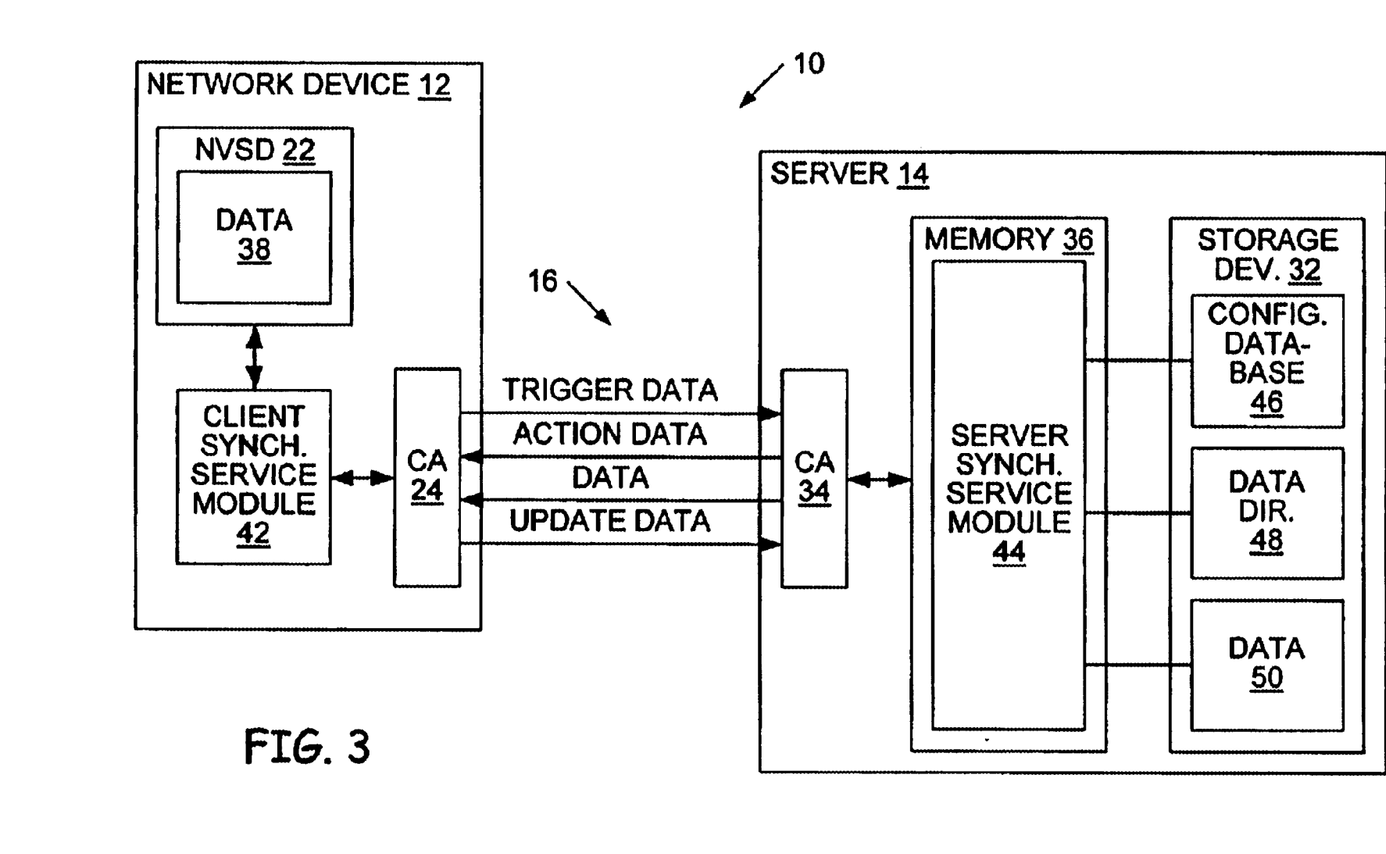
FIG. 3 is a block diagram of the computer system of FIG. 1 illustrating key components of the network device and the server and signals conveyed between the network device and the server in order to update the data stored within the non-volatile storage device.

FIGS. 3–7 will now be used to further describe network 10 and the operation of network 10. FIG. 3 is a block diagram of network 10 of FIG. 1 illustrating key components of network device 12 and server 14 and signals conveyed between network device 12 and server 14 in order to update data stored within non-volatile storage device (NVSD) 22 of network device 12. As described above and indicated in FIG. 3, data 38 including operating system data 40 is stored within non-volatile storage device 22 of network device 12.

In addition to communication adapter 24, network device 12 includes a client synchronization service module 42 coupled to non-volatile storage device 22 and communication adapter 24. The software client synchronization service module 42 may be implemented in software and/or hardware. The client synchronization service module 42 may reside within memory 20, non-volatile storage device 22, or communication adapter 24. Alternately, portions of the client synchronization service module 42 may be distributed among memory 20, non-volatile storage device 22, and communication adapter 24. The characteristics and functions of the client synchronization service module 42 will be described in detail below.

Server 14 includes a server synchronization service module 44. In the embodiment of FIG. 3, the server synchronization service module 44 is implemented in software and resides within memory 36 during operation of server 14. The server synchronization service module 44 is coupled to a configuration database 46, a data directory 48, and data 50 residing within storage device 32. Storage device 32 retains data even when electrical power is removed from storage device 32, and preferably includes one or more hard disk drives. The characteristics and functions of the server synchronization service module 44 will be described in detail below.

Data 38 stored within non-volatile storage device 22 of network device 12 is preferably grouped into files, wherein each file has a unique file name and corresponding version information (e.g., a date/time stamp, file size information, file checksum information, and/or implicit or explicit file versioning information). Configuration database 46 within storage device 32 may include configuration tables for each network device of network 10. A configuration table for network device 12 may include the file names and corresponding version information of each file of data 38 stored within non-volatile storage device 22 of network device 12. It is noted that a user accessing configuration database 46 may obtain file names and corresponding version information of data files stored within non-volatile storage devices of each network device of network 10.

Data 50 stored within storage device 32 of server 14 is preferably grouped into files, wherein each file has a unique file name and corresponding version information (e.g., a date/time stamp, file size information, file checksum information, and/or implicit or explicit file versioning information). Data directory 48 within storage device 32 may include the file names and corresponding version information of each file of data 50 stored within storage device 32 of server 14.

The files of data 50 stored within storage device 32 of server 14 may include updated (i.e., more current) versions of files of data 38 stored within non-volatile storage device 22 of network device 12. For example, data 38 stored within non-volatile storage device 22 of network device 12 may include a first file. Data 50 stored within storage device 32 of server 14 may include a second file, wherein the second file is an updated version of the first file. In this case, the first and second files have the same file name. The version information of the first and second files are different, however, and is used to distinguish the first and second files.

The client synchronization service module 42 of network device 12 may initiate an update of files of data 38 stored within non-volatile storage device 22 by transmitting trigger data to server 14 via communication adapter 24 and transmission medium 16. The client synchronization service module 42 of network device 12 may be configured to initiate the update, for example, during startup initialization of network device 12, periodically during operation of network device 12, during startup initialization of an application program stored within non-volatile storage device 22, in response to a user update request, or any combination of the above.

Figure 4:
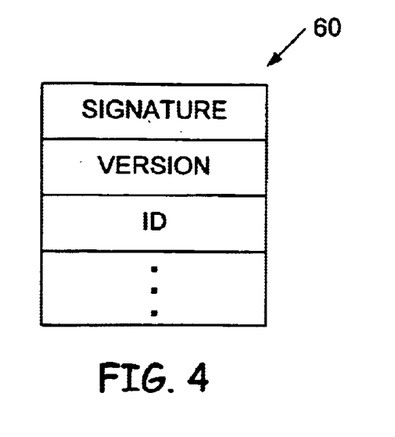
FIG. 4 is a block diagram of one embodiment of a message structure for conveying trigger data from the network device to the server.

FIG. 4 is a block diagram of one embodiment of a message structure 60 for conveying trigger data from network device 12 to server 14. In the embodiment of FIG. 4, message structure 60 includes signature information, version information, and identification (ID) information. The signature information identifies message structure 60 as conveying trigger data. The version information identifies a version of message structure 60 in order to allow different versions of message structure 60 to be distinguished from one another. The identification information identifies network device 12 as the source of message structure 60, and includes identification information unique to network device 12 (e.g., a "machine ID" of network device 12). The identification information may include, for example, an address associated with network device 12 such as an internet protocol (IP) address, a machine name associated with network device 12, or a serial number of network device 12.

The ID information may also include identification information unique to a specific user of network device 12. For example, several users may share network device 12. Data stored within non-volatile storage device 22 of network device 12 may be attributed to each user, and updates of data stored within non-volatile storage device 22 may be performed dependent upon user identification information. In general, the user identification information is a unique encoding identifying a specific user of network device 12. The user identification information may be, for example, a network administered "user ID" (e.g., a string of alphanumeric characters).

The server synchronization service module 44 may receive the trigger data via transmission medium 16 and communication adapter 34. Server synchronization service module 44 responds to the trigger data by generating action data. The action data includes data update instructions for updating files of data 38 stored within non-volatile storage device 22 of network device 12.

Figure 5:
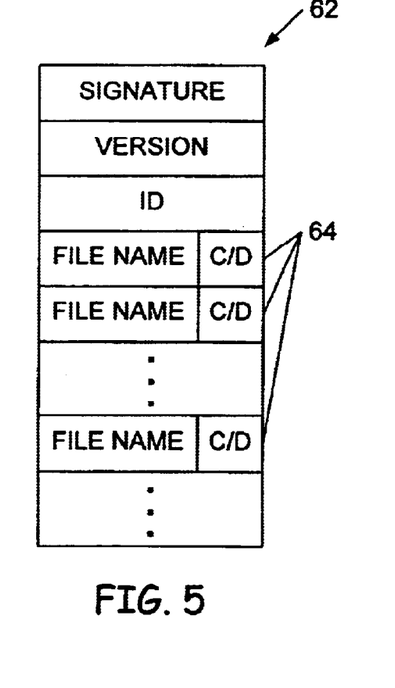
FIG. 5 is a block diagram of one embodiment of a message structure for conveying action data from the server to the network device.

FIG. 5 is a block diagram of one embodiment of a message structure 62 for conveying action data from server 14 to network device 12. In the embodiment of FIG. 5, message structure 62 includes signature information, version information, and identification information. The signature information identifies message structure 62 as conveying action data. The version information identifies a version of message structure 62 in order to allow different versions of message structure 62 to be distinguished from one another. The identification information includes the identification information unique to network device 12 and/or a specific user of network device 12 as described above, thereby identifying network device 12 as the destination of message structure 62.

Message structure 62 also includes data update instructions 64 for updating files of data 38 stored within non-volatile storage device 22 of network device 12. Each data update instruction 64 includes: (i) a file name of a file stored within non-volatile storage device 22 of network device 12, and (ii) a corresponding file update instruction labeled "C/D" in FIG. 5. The file update instruction is a direction to client synchronization service module 42 of network device 12 to either: (i) copy a file having the file name from data 50 within storage device 32 of server 14 to data 38 within non-volatile storage device 22, or (ii) delete the file having the file name from data 38.

Figure 6:
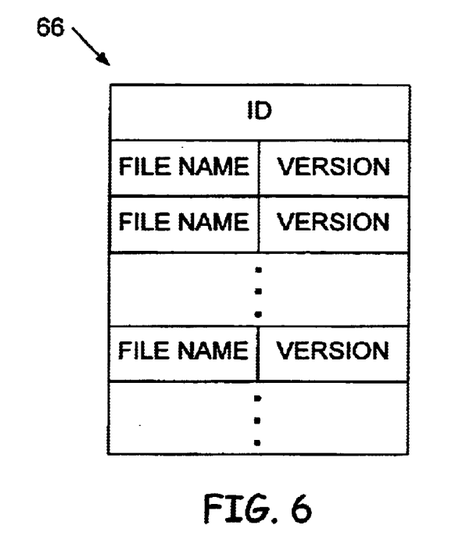
FIG. 6 is a block diagram of one embodiment of a configuration table corresponding to the network device and stored within a configuration database of the server.

The server synchronization service module 44 accesses configuration database 46 and data directory 48 within storage device 32 of server 14 in order to generate the action data. FIG. 6 is a block diagram of one embodiment of a configuration table 66 corresponding to network device 12 of FIG. 1 and stored within configuration database 46. Configuration table 66 includes the identification (ID) information of network device 12 and/or a specific user of network device 12, and a list of file names and corresponding version information of each file of data 38 stored within non-volatile storage device 22 of network device 12.

Special version information is used to identify files of data 38 which fit into two distinct categories. Files authorized to be stored within non-volatile storage device 22 but not present within non-volatile storage device 22 are identified by replacing the corresponding version information within configuration table 66 with a first special version identifier. In this case, the file names of such files are associated with the first special version identifier in configuration table 66. Files stored within non-volatile storage device 22 but not authorized to be stored within non-volatile storage device 22 are identified by replacing the corresponding version information within configuration table 66 with a second special version identifier. In this case, the file names of such files are associated with the second special version identifier in configuration table 66.

In order to generate the action data in response to the trigger data, the server synchronization service module 44 selects a file name from the list of file names and corresponding version information within configuration table 66. If the version information corresponding to the selected file name within configuration table 66 is the first version identifier (i.e., if the file having the selected file name is authorized to be stored within non-volatile storage device 22 but not present within non-volatile storage device 22), the server synchronization service module 44 adds the selected file name and a corresponding copy instruction to the action data as a data update instruction 64. The copy instruction directs client synchronization service module 42 to copy a file having the selected file name from data 50 of server 14 to data 38 of network device 12. When performed by client synchronization service module 42, the copy instruction will cause the file having the file name within data 50 to be stored within non-volatile storage device 22 and added to data 38.

If the version information corresponding to the selected file name within configuration table 66 is not the first or second version identifier (i.e., if the file having the selected file name is stored within non-volatile storage device 22 of network device 12 and authorized), the server synchronization service module 44 accesses data directory 48 using the file name. The server synchronization service module 44 compares the version information corresponding to the file name within configuration table 66 to the version information corresponding to file name within data directory 48.

If the version information corresponding to the file name within configuration table 66 does not match the version information corresponding to the file name within data directory 48, the server synchronization service module 44 adds the selected file name and an copy instruction to the action data as a data update instruction 64. The copy instruction instructs client synchronization service module 42 to copy a file having the selected file name from data 50 within server 14 to data 38. When performed by client synchronization service module 42, the copy instruction will cause the file having the file name within data 38 to be overwritten by the contents of the file copied from data 50, and thus updated.

If the version information corresponding to the selected file name within configuration table 66 is the second version identifier (i.e., if the file having the selected file name is present within non-volatile storage device 22 but not authorized to be stored within non-volatile storage device 22), the server synchronization service module 44 adds the selected file name and a corresponding delete instruction to the action data as a data update instruction 64, wherein the delete instruction instructs client synchronization service module 42 to delete the file having the selected file name from data 38.

The server synchronization service module 44 repeats the above steps for the remaining file names within the list of file names and corresponding version information of configuration table 66 in order to generate the action data.

The action data is conveyed from server 14 to network device 12. This may be accomplished by server synchronization service module 44 transmitting message structure 62 upon transmission medium 16 via communication adapter 34, and client synchronization service module 42 receiving message structure 62 from transmission medium 16 via communication adapter 24. Alternately, server synchronization service module 44 may store message structure 62 within server 14 (e.g., within storage device 32), and client synchronization service module 42 may retrieve message structure 62 from server 14 via transmission medium 16.

Client synchronization service module 42 carries out data update instructions 64 of the action data in order to update data 38. Client synchronization service module 42 carries out a given data update instruction 64 including a file name and a copy instruction by accessing data 50 within storage device 32 of server 14 via transmission medium 16, and copying the file of data 50 having the file name to non-volatile storage device 22. If a file having the same file name did not previously exist within non-volatile storage device 22 prior to the performance of the copy instruction, the file is in effect added to data 38 within non-volatile storage device 22. On the other hand, if a file having the same file name existed within non-volatile storage device 22 prior to performance of the copy instruction, the file is overwritten by the file copied from data 50, and thus updated.

Following performance of the data update instructions of the action data, client synchronization service module 42 generates update data. The update data includes configuration information resulting from the data update instructions of the action data, and is conveyed from network device 12 to server 14. Server synchronization service module 44 uses the update data to modify configuration database 46 such that configuration table 66 includes the file names and corresponding version information of each file of data 38 currently stored within non-volatile storage device 22.

Figure 7:
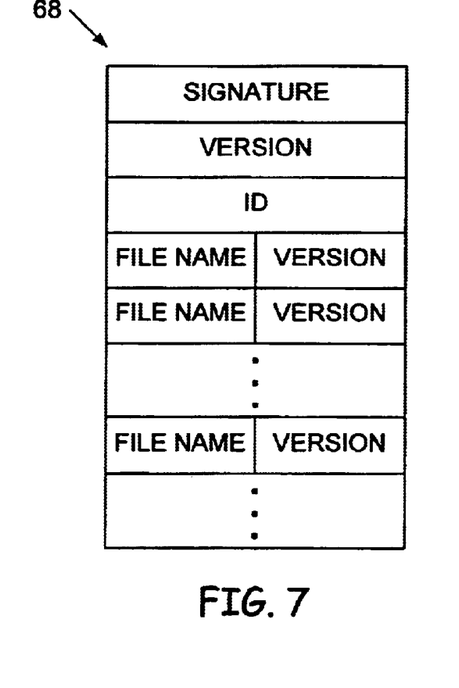
FIG. 7 is a block diagram of one embodiment of a message structure for conveying update data from the network device to the server.

FIG. 7 is a block diagram of one embodiment of a message structure 68 for conveying update data from network device 12 to server 14. In the embodiment of FIG. 7, message structure 68 includes signature information, version information, and identification information. The signature information identifies message structure 68 as conveying update data. The version information identifies a version of message structure 68 in order to allow different versions of message structure 68 to be distinguished from one another. The identification information includes the identification information unique to network device 12 and/or a specific user of network device 12 as described above, thereby identifying network device 12 as the source of message structure 68.

Message structure 68 also includes a list of file names and corresponding version information of files of data 38 updated and/or deleted as a result of the data update instructions of the action data. The file names of updated files are included along with the corresponding version information. Deleted files are identified by replacing the version information corresponding to file names with a special version identifier (e.g., the second special version identifier).

It is noted that server synchronization service module 44 may determine that no files stored within non-volatile storage device 22 need to be updated or deleted. In this case, the action data does not include data update instructions. Client synchronization service module 42 does not transfer data from server 14 to network device 12 via transmission medium 16, and does not transmit update data from network device 12 to server 14 via transmission medium 16. As a result, substantial network communication traffic only occurs only when one or more files stored within non-volatile storage device 22 need to be updated. Overall, network traffic generated by the above file synchronization mechanism is considered minimal.

It is noted that in network 10 of FIGS. 1 and 3, transmission medium 16 may provide a relatively low speed communication uplink (e.g., a telephone uplink) for data transmitted from network device 12 to server 14. Transmission medium 16, or an additional transmission medium, may provide a relatively high speed downlink (e.g., a satellite downlink) for data transmitted from server 14 to network device 12. The file synchronization mechanism described above is highly advantageous in this situation as only a relatively small amount of data, including trigger data and/or update data, travels via the relatively low speed communication uplink. The bulk of the data is transmitted from server 14 to network device 12 and travels via the relatively high speed downlink.

Figure 8A:
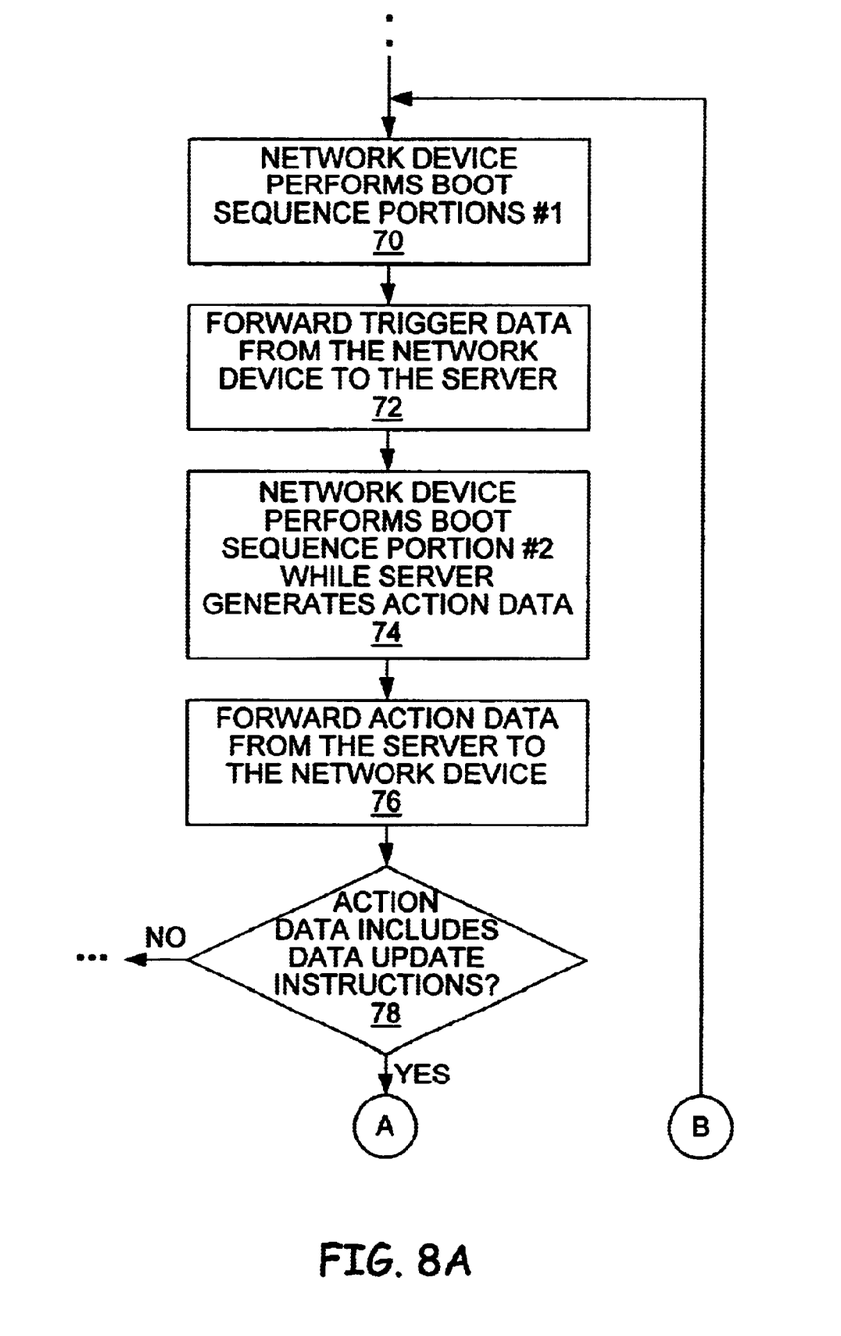
FIGS. 8A–B illustrate a flow chart of one embodiment of a method for updating the data stored within the non-volatile storage device of the network device during loading of an operating system into a memory of the network device (i.e., during an operating system boot sequence)
Figure 8B:
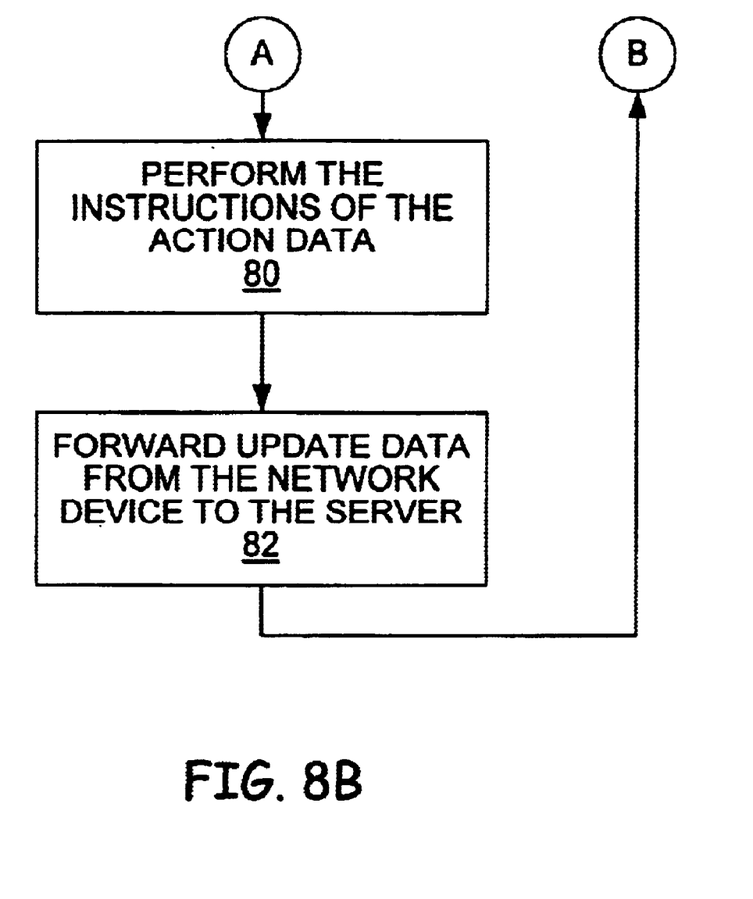

FIGS. 8A–B illustrate a flow chart of one embodiment of a method for updating data 38 during loading of an operating system into memory 20 of network device 12 (i.e., during an operating system boot sequence). As described above, execution of boot sequence instructions causes CPU 18 to load an operating system, and at least a portion of operating system data 40, into memory 20 of network device 12. CPU 18 then executes operating system instructions within memory 20. In the embodiment of FIGS. 8A–B, the boot sequence includes a first portion "portion #1" and a second portion "portion #2". CPU 18 performs the first portion of the boot sequence before the second portion. During a step 70, network device 12 performs the first portion of the boot sequence "portion #1".

Trigger data is forwarded from network device 12 to server 14 as described above during a step 72. During a step 74, network device 12 performs the second portion of the boot sequence "portion #2" while server 14 simultaneously generates action data. A particular method for generating the action data will be described in detail below. The action data generated by server 14 is conveyed from server 14 to network device 12 as described above during a step 76.

Client synchronization service module 42 of network device 12 analyzes the action data during a decision step 78.

If the action data includes no data update instructions, data 38 is up to date (i.e., synchronized with data 50), and no further action is required. On the other hand, if the action data includes at least one data update instruction, data 38 is "out of date" and must be updated.

During a step 80, client synchronization service module 42 performs the data update instructions of the action data. Client synchronization service module 42 then generates update data as described above, and forwards the update data from network device 12 to server 14 during a step 82. Following step 82, the boot sequence is restarted with step 70.

Figure 9A:
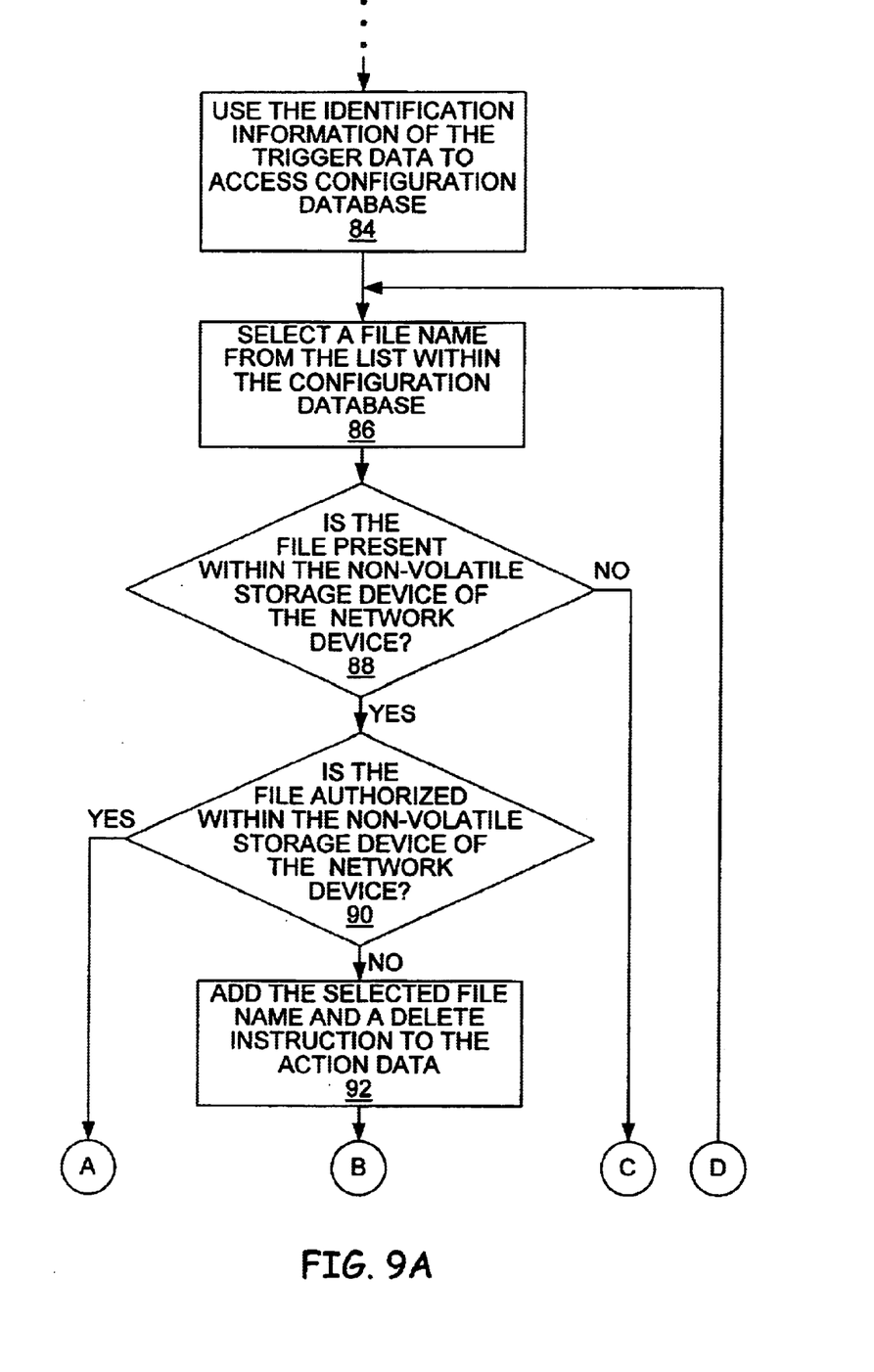
FIGS. 9A–B illustrate a flow chart of one embodiment of a method for generating action data for updating the data stored within the non-volatile storage device of the network device While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.
Figure 9B:
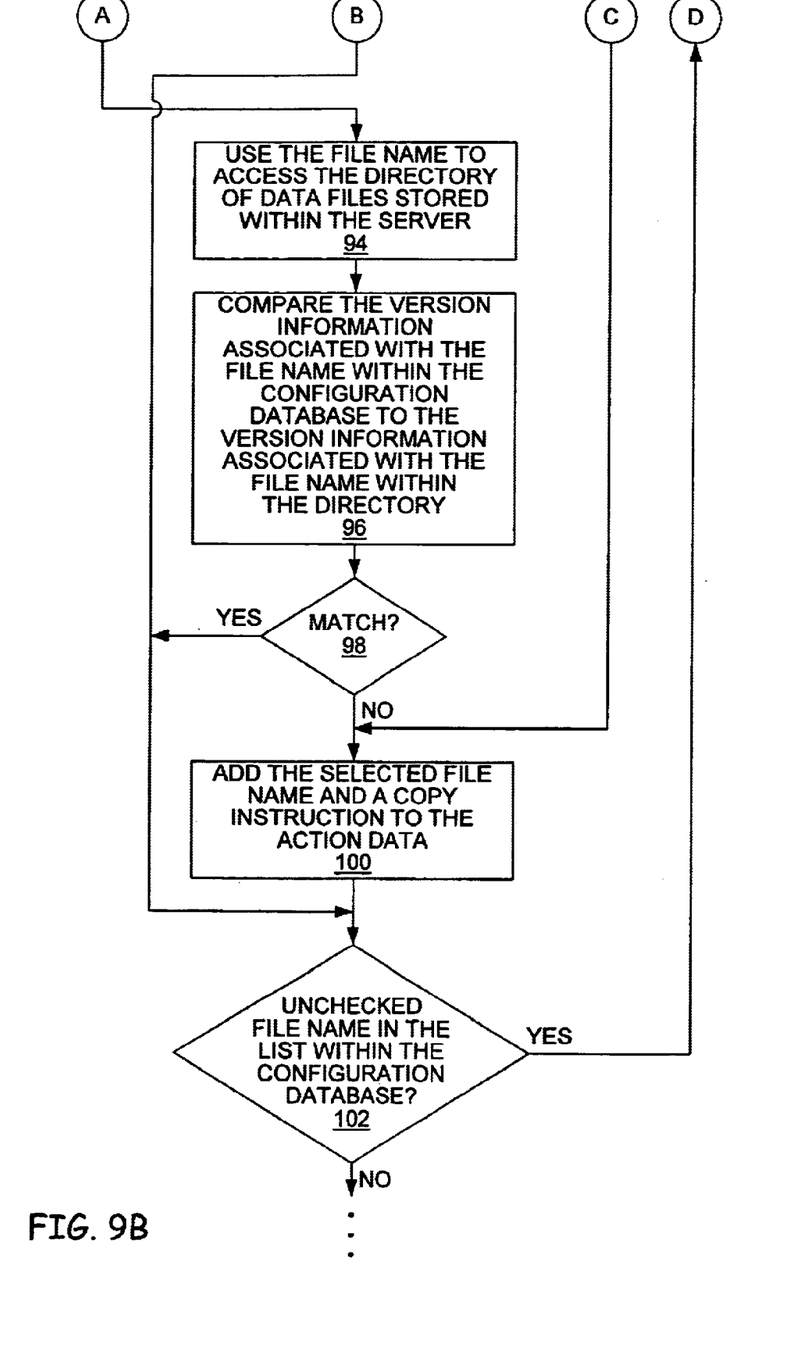

FIGS. 9A–B illustrate a flow chart of one embodiment of a method for generating the action data. Server 14 may embody the method of FIGS. 9A–B. In this case, server synchronization service module 44 uses the identification information of the trigger data, which identifies network device 12 as the source of the trigger data as described above, to access a portion of configuration database 46 pertaining to network device 12 (e.g., configuration table 66 of FIG. 6) during a step 84. As described above, configuration database 46 includes a list of file names and associated version information of files of data 38 stored within non-volatile storage device 22 of network device 12. During a step 86, server synchronization service module 44 selects a file name from the list within configuration database 46.

Server synchronization service module 44 analyzes the version information associated with the selected file name within configuration database 46 during decision steps 88 and 90. During decision step 88, server synchronization service module 44 determines if the file having the file name is present within non-volatile storage device 22 of network device 12. As described above, files authorized to be stored within non-volatile storage device 22 but not present within non-volatile storage device 22 are identified by replacing the corresponding version information within configuration table 66 with a first special version identifier. If the version information indicates that the file having the file name is present within non-volatile storage device 22 of network device 12, decision step 90 is the next step. On the other hand, if the version information indicates that the file having the file name is not present within non-volatile storage device 22 of network device 12, a step 100 described below is the next step.

During decision step 90, server synchronization service module 44 determines if the file having the file name is authorized within non-volatile storage device 22 of network device 12. As described above, files stored within non-volatile storage device 22 but not authorized to be stored within non-volatile storage device 22 are identified by replacing the corresponding version information within configuration table 66 with a second special version identifier. If the version information indicates that the file having the file name is authorized within non-volatile storage device 22 of network device 12, a step 94 described below is the next step.

On the other hand, if the version information indicates that the file having the file name is not authorized within non-volatile storage device 22 of network device 12, a step 92 is the next step. During step 92, server synchronization service module 44 adds the selected file name and a delete file update instruction to the action data as a data update instruction 64. As a result of the data update instruction, client synchronization service module 42 will delete the unauthorized file from non-volatile storage device 22. A decision step 102 described below follows step 92.

During step 94, server synchronization service module 44 uses the file name to access data directory 48. As described above, data directory 48 includes a list of file names and associated version information of files of data 50 stored within server 14. Server synchronization service module 44 compares the version information associated with the file name within configuration database 46 to the version information associated with the file name within data directory 48 during a step 96. During a decision step 98, server synchronization service module 44 determines whether the version information within configuration database 46 matches the version information within data directory 48. If so, step 102 described below is the next step. On the other hand, if the version information within configuration database 46 does not match the version information within data directory 48, step 100 is the next step.

During step 100, server synchronization service module 44 adds the selected file name and a copy file update instruction to the action data as a data update instruction 64. As a result of the data update instruction, client synchronization service module 42 will copy a file having the file name from data 50 within server 14 to data 38 within non-volatile storage device 22 of network device 12. Any file of data 38 having the file name will be overwritten, and thus updated. Decision step 102 follows step 100.

During decision step 102, if any file name remains unchecked within configuration database 46, step 86 described above is the next step. The process continues until all file names within configuration database 46 have been checked.

It will be appreciated by those skilled in the art having the benefit of this disclosure that this invention is believed to be a system and method for server managed updating of data, including operating system data, stored within a client network device. It is intended that the following claims be interpreted to embrace all such modifications and changes and, accordingly, the specification and drawings are to be regarded in an illustrative rather than a restrictive sense.

What is claimed is:

1. A network device, comprising a non-volatile storage device having data that can be modified during an operating system boot sequence, wherein the network device is adapted to;

generate and forward trigger data to a server located remote from the network device during the operating system boot sequence, wherein the trigger data includes identification information for identifying the network device;

modify the data during the operating system boot sequence solely in response to data update instructions if data update instructions are received from the server;

complete the operating system boot sequence if data update instructions are not received from the server;

generate and forward update data prior to repeating the operating system boot sequence for updating configuration data stored within the server, wherein the configuration data includes information about the data stored within the non-volatile storage device; and repeat the operating system boot sequence if the data is modified.

2. The network device as recited in claim 1, further comprising a memory, wherein the operating system boor sequence loads an operating system into the memory.

3. The network device as recited in claim 1, further comprising a central processing unit (CPU) adapted to execute instructions, wherein the data stored within the non-volatile storage device includes instructions for loading an application into a memory of the network device.

4. The network device as recited in claim 1, wherein the data stored within the non-volatile storage device of the network device is organized as a plurality of files each having a different file name.

5. The network device as recited in claim 4, wherein each data update instruction comprises a file name and a corresponding file update instruction, and wherein the file update instruction directs the network device to either: (i) copy a file having the file name from the server to the data stored within the non-volatile storage device of the network device, or (ii) delete a file having the fib name from the data stored within the non-volatile storage device of the network device.

6. The network device as recited in claim 1, wherein the network device is adapted to receive the data update instructions from the server.

7. The network device as recited in claim 1, wherein the network device is adapted to fetch the data update instructions from the server.

8. A network, comprising:
 a network device having a non-volatile storage device adapted to store data comprising operating system data; and
 a server coupled to the network device and comprising configuration data including information about the data stored within the non-volatile storage device,
 wherein the network device is adapted to:
  generate trigger data daring an operating system boot sequence, wherein the trigger data includes identification information for identifying the network device;
  update the data during the operating system boot sequence solely in response to action data conveyed from the server, wherein the action data includes at least one data update instruction for updating the operating system data;
  generate and forward update data during the operating system boot sequence for updating the configuration data; and
  repeat the operating system boot sequence.

9. The network as recited in claim 8, wherein the network device further comprises a memory, and wherein the operating system boot sequence loads an operating system into the memory.

10. The network as recited in claim 8, wherein the network device comprises a central processing unit (CPU) adapted to execute instructions, and wherein the data stored within the non-volatile storage device of the network device includes instructions.

11. The network as recited in claim 8, wherein die data stored within the non-volatile storage device of the network device is organized as a plurality of files each having a different file name.

12. The network as recited in claim 11, wherein the at least one data update instruction comprises a file name and a corresponding file update instruction, and wherein the file update instruction directs the network device to either: (i) copy a file having the file name from the server to the data stored within the non-volatile storage device of the network device, or (ii) delete a file having the file name from the data stored within the non-volatile storage device of the network device.

13. The network as recited in claim 12, wherein the data stored within the non-volatile storage device comprises a first file, and wherein die server comprises a second file stored within a storage device, and wherein the second file is an updated version of the first file such that the first and second files have the same file name.

14. The network as recited in claim 13, wherein the file name of the at least one data update instruction is the file name of the first file, and wherein the file update instruction directs the network device to copy a file having the file name of the first file from the server to the data stored within the non-volatile storage device of the network device, and wherein the network device is adapted to respond to the file update instruction by copying the second file from the server to the data stored within the non-volatile storage device such that the first file is overwritten by the second file.

15. The network as recited in claim 8, wherein the server is adapted to determine if one or more files of the data is authorized to be stored within the network device before the action data is conveyed to the network device.

16. The network as recited in claim 15, wherein the server is further adapted to determine if the one or more data flies is present within the network device before the action data is conveyed to the network device.

17. The network as recited in claim 16, wherein the server is further adapted to determine if the one or more data files is identical to one or more modified data files stored within the server before the action data is conveyed to the network device.

18. The network as recited in claim 8, further comprising
 transmission medium interposed between the network device and the server; and
 communication adaptors respectively located within the network device and the server, wherein the communication adaptors are configured to transmit and receive data via the transmission medium, and wherein die transmission medium is configured to provide a relatively low speed communication uplink for data transmitted from the network device to the server and a relatively high speed communication down link for data transmitted from the server to the network device.

19. A method for updating data within a computer system, comprising:
 forwarding trigger data from a network device to a server located remote from the network device during an operating system boot sequence, wherein the trigger data identifies the network device;
 conveying action data front the server to the network device during the operating system boot sequence, wherein the action data includes at least one data update instruction for updating data stored within a non-volatile storage device of the network device, and wherein the data stored within the non-volatile storage device includes operating system data;
 updating configuration data stored exclusively within the server to reflect the data stored within the non-volatile storage device of the network device; and
 repeating the operating system boot sequence.

20. The method as recited in claim 19, wherein the data stored within the non-volatile storage device of the network device is updated by the network device only in response to the action data.

21. The method as recited in claim 19, wherein the data stored within the non-volatile storage device of the network device is organized as a plurality of files each having a different file name.

22. The method as recited in claim 21, wherein the at least one data update instruction includes a file name and a corresponding file update instruction, and wherein the file update instruction directs the network device to either: (i)

copy a file having the file name from the server to the data stored within the non-volatile storage device of the network device, or (ii) delete a file having the file name front the data stored within the non-volatile storage device of the network device.

23. The method as recited in claim 19, further comprising performing the at least one data update instruction of the action data.

24. The method as recited in claim 19, wherein the updating is accomplished subsequent to the performing the at least one data update instruction and prior to the repeating the operating system boot sequence.

25. A method for updating data within a non-volatile storage device of a network device, comprising:

forwarding trigger data during an operating system boot sequence, wherein the trigger data identifies the network device;

receiving action data during the operating system boot sequence, wherein the action data includes at least one data update instruction for updating data stored within a non-volatile storage device of the network device, and wherein the data stored within the non-volatile storage device includes operating system data;

completing the operating system boat sequence upon not receiving action data;

forwarding update data prior to repeating the operating system boot sequence for updating configuration data, wherein the configuration data includes information about the data stored within the non-volatile storage device; and repeating the operating system boot sequence if the data stored within a non-volatile storage device or the network device is updated.

26. A method for updating data within a non-volatile storage device of a network device, comprising:

receiving trigger data from the network device following a first portion of an operating system boot sequence occurring within the network device, wherein the trigger data identifies the network device;

determining whether data stored within the non-volatile storage device of the network device needs to be based upon the trigger data;

generating action data comprising at least one data update instruction for updating the data stored within a non-volatile storage device of the network device if a determination is made that the data stored within the non-volatile storage device of the network device needs to be updated, wherein the data stored within the non-volatile storage device includes operating system data; and forwarding the action data to the network device such that the network device receives the action data following a second portion of the operating system boot sequence.

* * * * *

UNITED STATES PATENT AND TRADEMARK OFFICE
CERTIFICATE OF CORRECTION

PATENT NO. : 6,742,025 B2
DATED : May 25, 2004
INVENTOR(S) : Jennery et al.

It is certified that error appears in the above-identified patent and that said Letters Patent is hereby corrected as shown below:

Column 12,
Line 44, please delete "adapted to;" and substitute therefor -- adapted to: --.
Line 63, please delete "system boor" and substitute therefor -- system boot --.

Column 13,
Line 13, please delete "fib name" and substitute therefor -- file name --.
Line 29, please delete "daring" and substitute therefor -- during --.
Line 51, please delete "die data" and substitute therfor -- the data --.
Line 66, please delete "die server" and substitute therefor -- the server --.

Column 14,
Line 18, please delete "data flies" and substitute therefor -- data files --.
Lines 32-33, please delete "die transmission" and substitute therefor -- the transmission --.
Line 37, please delete "down link" and substitute therefor -- downlink --.

Column 15,
Line 3, please delete "file name front" and substitute therefor -- file name from --.
Line 23, please delete "boat sequence" and substitute therefor -- boot sequence --.

Column 16,
Line 2, please delete "device or the" and substitute therefor -- device of the --.
Line 13, please delete "be based" and substitute therefor -- be updated based --.

Signed and Sealed this

Ninth Day of November, 2004

JON W. DUDAS
*Director of the United States Patent and Trademark Office*